Dec. 25, 1934.                J. J. BANAS                 1,985,812
                            HYDRAULIC BRAKE
                         Filed June 15, 1932        2 Sheets-Sheet 1
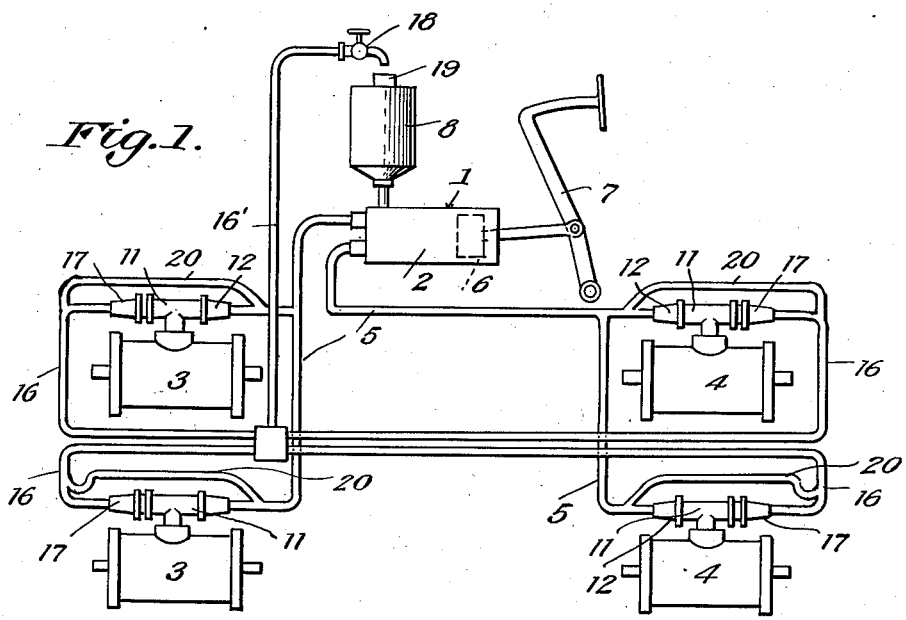
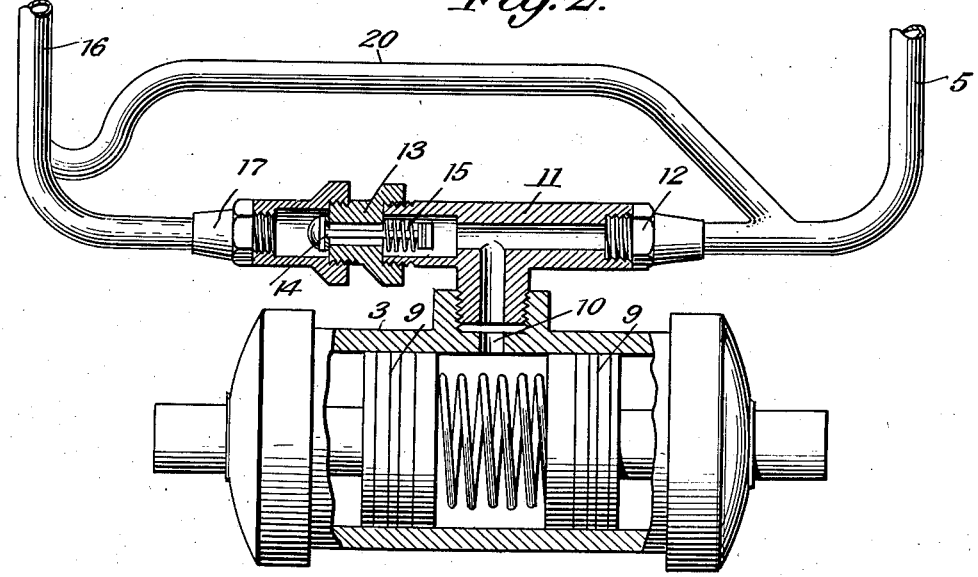
Joseph John Banas
INVENTOR
BY Victor J. Evans & Co.
ATTORNEYS Dec. 25, 1934.                J. J. BANAS                1,985,812
                              HYDRAULIC BRAKE
                         Filed June 15, 1932        2 Sheets-Sheet 2
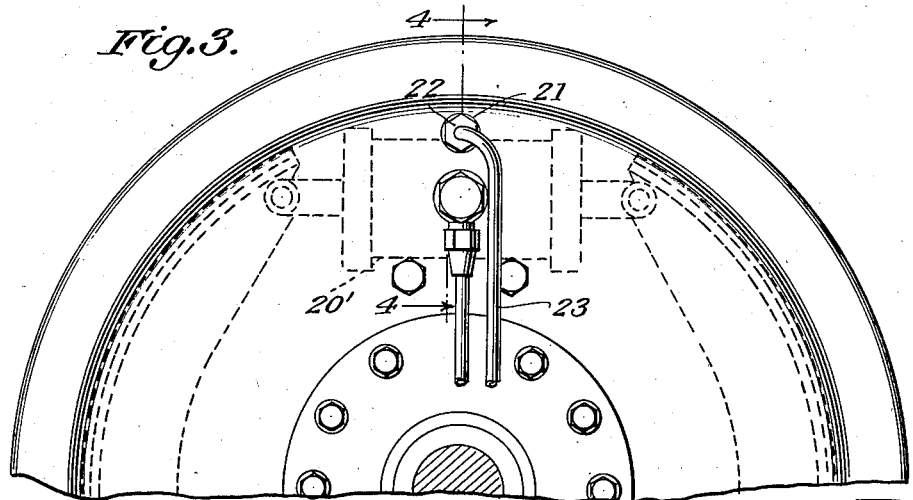
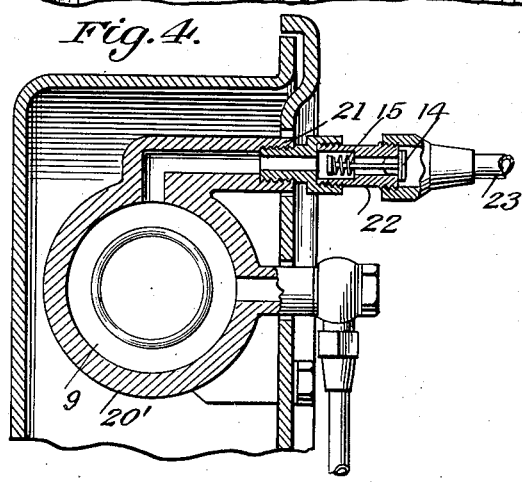
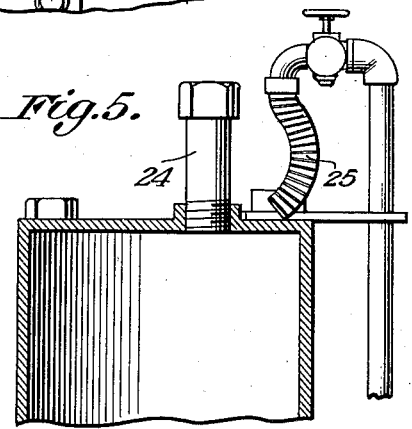
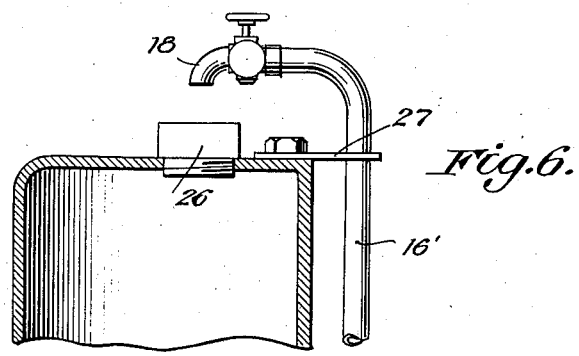
Joseph John Banas
INVENTOR
BY Victor J. Evans & Co.
ATTORNEYS Patented Dec. 25, 1934

1,985,812

UNITED STATES PATENT OFFICE 1,985,812

HYDRAULIC BRAKE

Joseph John Banas, Niagara Falls, N. Y.

Application June 15, 1932, Serial No. 617,417

1 Claim. (Cl. 60—54.5)

This invention relates to hydraulic brakes for motor vehicles and more particularly to an attachment therefor and has for the primary object, the provision of means whereby a person unskilled in the art of mechanics may easily and quickly bleed the entire brake system when the brake pedal fails to function properly, due to air entering the system by loss of fluid from evaporation or small leaks in some part of the system.

Another object of this invention is the provision of means whereby the fluid escaping from the system during the bleeding operation may be returned to the reserve supply or if unfit for further use may be dispensed with.

With this and other objects in view, this invention consists in certain novel features of construction, combination, and arrangement of parts to be hereinafter more fully described and claimed.

For a complete understanding of my invention, reference is to be had to the following description and accompanying drawings, in which Figure 1 is a diagrammatical view illustrating a hydraulic brake system with an attachment applied thereto and constructed in accordance with my invention.

Figure 2 is a fragmentary vertical sectional view illustrating the attachment between the auxiliary cylinder and the master cylinder.

Figure 3 is a fragmentary side elevation illustrating a modified form of my invention wherein the attachment is connected to the usual bleed opening provided in the auxiliary cylinder.

Figure 4 is a detail sectional view taken on the line 4—4 of Figure 3.

Figure 5 is a detail sectional view illustrating the means of returning fluid to the reserve supply when bleeding the system.

Figure 6 is a similar view showing a slight modification of the means of returning the fluid to the reserve supply.

Referring in detail to the drawings, the numeral 1 indicates a conventional type of hydraulic braking system employed upon motor vehicles, consisting of a master cylinder 2 connected to the front and rear auxiliary cylinders 3 and 4 by pipes 5. A master piston 6 operates in the master cylinder by a foot pedal 7. The master cylinder 2 is fed with liquid from a reserve tank 8, the connection between the reserve tank 8 and the master cylinder is such that the system will be kept full of liquid automatically furnished from the reserve tank. The replenishing of the brake system with liquid from the reserve tank 8 is well known in the art and it is not thought necessary to describe or show this construction in detail. Each auxiliary cylinder has the usual pistons 9 for actuating the brake bands or shoes of the brakes and are moved into non-braking position by springs. Each auxiliary cylinder has a port 10 to which a fitting 11 of substantially T-shape is secured. One end of the fitting 11 is connected to the pipe 5, as shown at 12, while the opposite end has connected thereto a valve mounting 13. The valve mounting 13 supports a check valve 14 held in a seated position by a spring 15. Bleed pipes 16 are connected to the valve mountings by couplings 17 and said pipes 16 are connected to a pipe 16' by a suitable coupling or junction box and the pipe 16' carries a valve 18, the discharge end of which is disposed over the filling opening of the reserve tank 8. The filling opening of the reserve tank is normally closed by a removable cap 19. Bypass pipes 20 are in communication with the pipes 5 and the pipes 16, as clearly shown in Figure 2. The pipes 5 and fittings 11 are of such a strength that they will withstand the maximum pressure within the brake system. However, the pipes 16 and 16' are weaker than the pipes 5 so as to reduce the cost of manufacture of my invention.

It is to be understood that during normal operation of the hydraulic brake system, all cylinders, pipes and fittings are filled with liquid and that the valve 18 is closed and further it is to be understood that the brakes are applied by depressing the brake pedal and are released on the release or return of the brake pedal to a normal or non-brake applying position. During the application of the brakes all pipes and fittings are under maximum pressure and during the non-application of the brakes this pressure is materially reduced. The bypass pipes 20 function to prevent maximum pressure from being trapped in the pipes 16 and 16' by the valves 14 when the brakes are released, it being understood that the pipes 16 and 16' are under maximum pressure during the application of the brakes, that is, under the same pressure as the pressure in the pipes 5. The check valves 14 act to prevent the liquid pressure in the pipes 16 and 16' from passing through the fittings 11 during the release of the brakes, consequently compelling said pressure to pass to the pipes 5 by way of the bypass pipes 20. The maximum pressure in the auxiliary cylinders can reduce rapidly on the return of the brake pedal to non-brake applying position as it is not interfered with by the reduction of pressure taking place in the pipes 16 and 16'. The rapidity in which the maximum pressure in the auxiliary cylinders can reduce obviates slow releasing of the brakes after the brake pedal has returned to non-brake applying position. Dragging or slow releasing of the brakes is thereby obviated after the return of the brake pedal to non-brake applying position.

After periods of use hydraulic brake systems become ineffective in operation due to air getting into the system and to bleed the system of air the auxiliary cylinders must be opened to the atmosphere and the master piston reciprocated rapidly to drive the air out of the system. To permit simultaneous bleeding of the auxiliary cylinders and the pipes of the brake system, the valve 18 is opened and, as before stated, the master piston is reciprocated rapidly. The movement of the master piston inwardly of the cylinder drives the air outwardly by way of the valve 18 along with liquid which has air mixed therein. The liquid being moved by the master piston during its inward movement of the master cylinder, said liquid passes through the bypass pipes 20 and through the pipes 16 and 16'. This liquid creates a partial vacuum to the left of the valves 14, aiding in unseating the valves so that the liquid under pressure in the auxiliary cylinders can pass therefrom through the valve mountings 13 about said valves 14 to the pipes 16 and 16' back to the reserve tank 8. When the liquid discharging from the valve 18 is free of bubbles, said valve 18 is closed and the liquid in the system is restored to normal by a few more strokes of the master piston, additional liquid being supplied to the brake system from the reserve tank during the described bleeding operation.

Referring to my modified form of invention as shown in Figures 3 and 4, the auxiliary cylinder 20' is of the type having a bleed nipple 21 normally closed by a plug. To employ my invention with the auxiliary cylinder 20' the plug is removed and the valve mounting 22 similar in construction to the valve mounting 13 is connected to the nipple 21 and the valve mounting 22 is connected to a pipe 23. Each of the pipes 23 of the auxiliary cylinders is connected to a main bleed pipe similar in construction to the bleed pipe 16 so that when the faucet thereof is opened and the master piston reciprocated, the entire system including all of the pipes and the auxiliary cylinders may be bled of air.

In some brake systems now in use, the reserve tank is provided with a comparatively long closure plug 24 and to facilitate the directing of the fluid into the reserve tank from the system during the bleeding thereof, the faucet is provided with a flexible tube 25 which may be inserted into the opening of the supply tank when the plug 24 is removed, however, when the tank is provided with a short plug 26 as shown in Figure 6, the faucet may be disposed directly over the opening so that when the plug is removed the fluid may drain directly into the reserve tank from the faucet. The bleed pipe may be connected to the reserve tank by a bracket 27.

While I have shown and described the preferred embodiment of my invention, it will be understood that minor changes in construction, combination and arrangement of parts may be made without departing from the spirit and scope of my invention, as claimed.

Having thus described my invention, what I claim is:

A hydraulic brake system including auxiliary cylinders having pistons for operating brakes and a master cylinder provided with a master piston adapted to be reciprocated for applying and releasing the brakes, fittings connected to the auxiliary cylinders, pipes connecting the fittings to the master cylinder, bleed tubes connected to said fittings, check valves between said fittings and bleed tubes, bypass pipes connecting the first-named pipes to said tubes, a single bleed tube connected to the first-mentioned bleed tubes, and a valve for opening and closing the single bleed tube.

JOSEPH JOHN BANAS.